United States Patent
Peiffer et al.

(10) Patent No.: US 6,794,051 B2
(45) Date of Patent: Sep. 21, 2004

(54) TRANSPARENT POLYESTER FILM WITH ENHANCED WATER VAPOR BARRIER, ITS PRODUCTION AND USE

(75) Inventors: Herbert Peiffer, Mainz (DE); Gottfried Hilkert, Saulheim (DE)

(73) Assignee: Mitsubishi Polyester Film GmbH, Wiesbaden (DE)

(*) Notice: Subject to any disclaimer, the term of this patent is extended or adjusted under 35 U.S.C. 154(b) by 0 days.

(21) Appl. No.: 10/441,545

(22) Filed: May 20, 2003

(65) Prior Publication Data

US 2003/0224191 A1 Dec. 4, 2003

(30) Foreign Application Priority Data

May 28, 2002 (DE) .......................... 102 23 662

(51) Int. Cl.⁷ .................... B32B 27/08; B32B 27/32; B32B 27/36; B32B 31/30
(52) U.S. Cl. ..................... 428/483; 428/36.6; 428/212; 428/480; 428/910; 264/288.4; 264/290.2; 525/165; 525/173; 525/174; 525/177
(58) Field of Search ................ 428/36.6, 212, 428/480, 483, 910; 264/288.4, 290.2; 525/165, 173, 174, 177

(56) References Cited

U.S. PATENT DOCUMENTS

| | | | | |
|---|---|---|---|---|
| 5,532,030 A | * | 7/1996 | Hirose et al. | 428/35.7 |
| 5,686,156 A | * | 11/1997 | Matsui et al. | 428/36.6 |
| 5,783,273 A | * | 7/1998 | Yamamoto et al. | 428/35.9 |
| 5,795,528 A | | 8/1998 | Klein et al. | 264/290.2 |
| 5,912,070 A | | 6/1999 | Miharu et al. | 428/214 |
| 6,017,616 A | * | 1/2000 | Kochem et al. | 428/220 |
| 6,068,936 A | * | 5/2000 | Peiffer et al. | 428/500 |
| 6,316,560 B1 | * | 11/2001 | Jacobs et al. | 526/160 |
| 6,326,431 B1 | * | 12/2001 | Peiffer et al. | 525/177 |
| 6,342,549 B1 | * | 1/2002 | Hirose et al. | 524/120 |
| 6,365,686 B1 | * | 4/2002 | Jacobs et al. | 526/127 |
| 6,497,939 B1 | * | 12/2002 | Obuchi et al. | 428/156 |
| 6,544,610 B1 | * | 4/2003 | Minami et al. | 428/35.7 |
| 2002/0012781 A1 | * | 1/2002 | Beer et al. | 428/220 |

FOREIGN PATENT DOCUMENTS

| | | | | |
|---|---|---|---|---|
| DD | 237 070 | | 7/1986 | ......... C08F/210/02 |
| DE | 100 42 329 A1 | | 3/2002 | .......... B32B/27/36 |
| EP | 0 156 464 A1 | | 10/1985 | ......... C08F/210/02 |
| EP | 0 283 164 A2 | | 9/1988 | ......... C08F/210/00 |
| EP | 0 407 870 A2 | | 1/1991 | .......... C08F/32/08 |
| EP | 0 485 893 A1 | | 5/1992 | .......... C08F/32/08 |
| EP | 0 503 422 A1 | | 9/1992 | ......... C08F/232/08 |
| EP | 1 068 949 A1 | | 1/2001 | .......... B32B/27/36 |
| JP | 07-247411 | * | 9/1995 | |
| JP | WO 96/01184 | * | 1/1996 | |
| WO | 0 602 964 A1 | | 6/1994 | .......... G11B/5/704 |
| WO | WO 99/62694 A1 | | 12/1999 | .......... B29C/55/02 |

* cited by examiner

Primary Examiner—Vivian Chen
(74) Attorney, Agent, or Firm—ProPat, L.L.C.

(57) ABSTRACT

Transparent, multilayer, biaxially oriented polyester films having a) a base layer B composed of at least 50% by weight of a thermoplastic polyester and from 0 to 30% by weight of a cycloolefin copolymer and b) an outer layer composed of from 20 to 100% by weight of a cycloolefin copolymer, the glass transition temperature of the cycloolefin copolymers being less than 120° C., possess very good water vapor barrier properties and effective adhesion between the layers. These films are especially suitable for packaging foods and other consumables.

22 Claims, No Drawings

TRANSPARENT POLYESTER FILM WITH ENHANCED WATER VAPOR BARRIER, ITS PRODUCTION AND USE

The invention relates to a multilayer, transparent, biaxially oriented polyester film which has a base layer B and at least one outer layer A. The film comprises cycloolefin copolymers (COCs) having a low glass transition temperature. The invention further relates to a process for producing the film, and to its use.

BACKGROUND OF THE INVENTION

Transparent biaxially oriented polyester films which feature enhanced barrier properties are prior art. In virtually all instances the films acquire their enhanced barrier properties offline, following actual production, by virtue of an additional processing step. Examples of such aftertreatments include extrusion coating, coating or lamination with barrier materials, coating in vacuum with metals or with ceramic substances, or plasma polymerization in conjunction with vacuum coating.

An exception to this is the process described in more detail in WO 99/62694, in which a multilayer, coextruded polyester film comprising at least one layer of EVOH (ethylene-vinyl alcohol) is simultaneously biaxially drawn. The resultant film features good mechanical properties and good barrier properties. Using the film, an oxygen transmission rate (OTR) of not less than 5 $cm^3/(m2 \cdot bar \cdot d)$ is obtained. As far as the water vapor transmission rate (WVTR) obtained with the film is concerned, no information is forthcoming. A disadvantage of this process is that the reclaimed material obtained cannot be passed back to the production operation without the film without the film which then results losing its good optical properties.

U.S. Pat. No. 5,795,528 describes a coextruded film laminate with alternating layers of PEN and PET. The film laminate exhibits a heightened barrier to oxygen and water vapor, but tends toward delamination between the individual layers of PEN and PET. Between these layers there is virtually no adhesion. A laminate of this kind is therefore unsuitable for practical use.

U.S. Pat. No. 5,912,070 describes a coextruded film laminate which is resistant to temperature and impact, exhibits a barrier to water vapor, and can be torn by hand. The film is composed of one or more plies of a thermoplastic polyester base material (A), one or more plies of a resin based on cycloolefin polymers (C), and one or more intermediate layers of an adhesion promoter (B). The cycloolefin polymer of the layer (C) features a glass transition temperature of 60 to 120° C. and may have been prepared either by the ring-opening method or by way of metallocene catalysts. The adhesion promoter layer (B) is located between the two layers (A) and (C). The adhesion promoters specified include a range of known polymers, the preferred polymers listed including graft-modified random copolymers based on ethylene and a-olefins. The graft modification of these copolymers is carried out, for example, with unsaturated dicarboxylic acids or with derivatives thereof. In one preferred embodiment the film is biaxially oriented. Disadvantages of the film are its complex construction and the associated high level of technical complexity required for its production. These problems are particularly disadvantageous in the context of reusing the cut film scrap obtained. Because of the many different kinds of polymers for the three different layers, the cut film scrap can no longer be reused as reclaim, e.g., for the base layer (A), since it generally leads to an unduly high yellow coloration of the resultant film.

EP-A-1 068 949 relates to a white, biaxially oriented polyester film having at least one base layer, the characterizing features of which are that at least this base layer contains a cycloolefin copolymer (COC) in a concentration of from 2 to 60% by weight, based on the base layer, the glass transition temperature of the cycloolefin copolymer (COC) being in the range from 70 to 270° C. The glass transition temperature of the COC and the stretching temperatures are chosen so as to give an opaque-white film of low density. The film does not feature enhanced barrier values with respect to water vapor. For example, if a transparent, standard polyester film 23 mm thick and containing no COC has a WVTR of 21 $g/(m^2 \cdot d)$, a film according to EP-A-1 068 949, Example 1 (10% COC), is found to have a WVTR of about 27 $g/(m^2 \cdot d)$.

It is an object of the present invention, therefore, to provide a polyester film which is distinguished by enhanced barrier properties, particularly with respect to the passage of water vapor. Such a film should not have the disadvantages of the prior art films and should additionally be distinguished by the ensured possibility, during the production of the film, that the reclaim produced can be passed back to the extrusion operation without any notable adverse effect on the physical and optical properties of the resultant film, but particularly the barrier with respect to water vapor. Effective adhesion between the individual layers of a coextruded film must likewise be ensured for the purpose of their practical application.

At the same time, the other properties which characterize a polyester film should not suffer deterioration. These include, for example, the mechanical and the thermal properties, the winding characteristics, and the processing properties of the film, particularly in the case of subsequent printing, lamination, or coating with metallic or ceramic materials.

BRIEF DESCRIPTIONS OF THE INVENTION

This object is achieved by means of a multilayer, transparent, biaxially oriented polyester film which has a base layer B composed of at least 50% by weight of a thermoplastic polyester, and has at least one outer layer A, wherein a) the base layer B comprises a fraction of from 0 to 30% by weight of a cycloolefin copolymer (COC), b) the outer layer A comprises a fraction of from 20 to 100% by weight of a cycloolefin copolymer (COC), c) the glass transition temperature $T_g$ of the cycloolefin copolymer (COC) is below 120° C., and d) the permeation coefficient of the film for water vapor is smaller than 35 g[12 μm]/$m^2 \cdot d$. d denotes day.

DETAILED DESCRIPTION OF THE INVENTION

The biaxially oriented, transparent polyester film according to the present invention has a water vapor transmission rate which is significantly reduced as compared with prior art films. At the same time, a minimum adhesion between the individual layers of the film of greater than 0.5 N/25 mm is ensured.

The abovementioned figures for composition and physical parameters are preferred figures, in the case of which the desired properties of the film of the invention are particularly pronounced.

The film of the invention is of at least two-layer construction. In that case it is composed of a base layer B and an outer layer A.

The percentages by weight are based in each case on the total weight of the layer in question.

The base layer of the film is composed preferably of at least 60% by weight, based on the weight of the base layer B, of a thermoplastic polyester. Examples of polyesters suitable for this purpose are those formed from ethylene glycol and terephthalic acid (i.e., polyethylene terephthalate, PET), from ethylene glycol and naphthalene-2,6-dicarboxylic acid (i.e., polyethylene 2,6-naphthalate, PEN), from 1,4-bishydroxymethylcyclohexane and terephthalic acid (i.e., poly-1,4-cyclohexanedimethylene terephthalate, PCDT), and from ethylene glycol, naphthalene-2,6-dicarboxylic acid, and biphenyl-4,4'-dicarboxylic acid (i.e., polyethylene 2,6-naphthalate bibenzoate, PENBB). Particularly preferred polyesters are those composed of at least 90 mol %, preferably at least 95 mol %, of ethylene glycol and terephthalic acid units or of ethylene glycol and naphthalene-2,6-dicarboxylic acid units. The remaining monomer units originate from other diols and/or dicarboxylic acids. Suitable thermoplastic polyesters for the base layer B can also be polyester copolymers or blends based on polyester, particularly those described in more detail as component II for the outer layer A.

Examples of suitable further aliphatic diols as polyester component include diethylene glycol, triethylene glycol, aliphatic glycols of the general formula $HO\text{—}(CH_2)_n\text{—}OH$, where n represents an integer from 3 to 6 (especially propane-1,3-diol, butane-1,4-diol, pentane-1,5-diol, and hexane-1,6-diol), or branched aliphatic glycols having up to 6 carbon atoms, and cycloaliphatic diols with one or more rings, with or without heteroatoms. Among the cycloaliphatic diols, mention may be made of cyclohexane diols (especially cyclohexane-1,4-diol). Other suitable aromatic diols correspond, for example, to the formula $HO\text{—}C_6H_4\text{—}X\text{—}C_6H_4\text{-}OH$, where X preferably stands for $\text{—}CH_2\text{—}$, $\text{—}C(CH_3)_2\text{—}$, $\text{—}C(CF_3)_2\text{—}$, $\text{—}O\text{—}$, $\text{—}S\text{—}$ or $\text{—}SO_2\text{-}$. Also highly suitable are bisphenols of the formula $HO\text{—}C_6H_4\text{—}C_6H_4\text{—}OH$.

Suitable further aromatic dicarboxylic acids are preferably benzenedicarboxylic acids, naphthalenedicarboxylic acids (for example, naphthalene-1,4- or -1,6-dicarboxylic acid), biphenyl-x,x'-dicarboxylic acids (especially biphenyl-4,4'-dicarboxylic acid), diphenylacetylene-x,x=-dicarboxylic acids (especially diphenylacetylene-4,4'-dicarboxylic acid) or stilbene-x,x=-dicarboxylic acids. Among the cycloaliphatic dicarboxylic acids, mention may be made of cyclohexanedicarboxylic acids (especially cyclohexane-1,4-dicarboxylic acid). Among the aliphatic dicarboxylic acids, the $C_3\text{-}C_{19}$ alkanedioic acids are particularly suitable, in which the alkane moiety may be linear or branched.

The thermoplastic polyesters can be prepared, for example, by the transesterification method. This method starts from dicarboxylic esters and diols, which are reacted with standard transesterification catalysts, such as salts of zinc, of calcium, of lithium, and of manganese. The intermediates are then subjected to polycondensation in the presence of standard polycondensation catalysts, such as antimony trioxide or titanium salts. Preparation may equally well take place by the direct esterification method in the presence of polycondensation catalysts. In that case the dicarboxylic acids and diols are used directly as starting materials.

In accordance with the invention the base layer B contains a cycloolefin copolymer COC in an amount of from 0 to 30% by weight, based on the weight of the base layer. From 2 to 25% by weight is preferred and from 5 to 20% by weight particularly preferred.

The properties—described below in respect of outer layer A—of the COCs it comprises also apply in respect of the COCs of the base layer. In principle, the COCs present in the base layer and in the outer layers may be identical or different.

In accordance with the invention the outer layer A contains a cycloolefin copolymer COC (i.e., component I) in an amount of from 20 to 100% by weight, preferably from 25 to 95% by weight, and more preferably from 30 to 90% by weight, based on the weight of the outer layer A. Where the weight fraction of the COC is less than 20%, the positive effect on the water vapor barrier is generally insufficient.

It is critical to the present invention that the cycloolefin copolymer COC is selected so that it can be drawn together with the further components of the outer layer A and with those of the other layers B and, where appropriate, C without notable formation of vacuoles during the drawing operation. Such vacuoles contribute to impairing the barrier properties and will at the same time have a sustained adverse effect on the optical properties of the film.

A selection criterion for the cycloolefin copolymer, said criterion being critical to the present invention, is the glass transition temperature $T_g$, which in accordance with the invention must be below 120° C. and ought preferably to be less than 100° C. and more preferably less than 80° C. Where a cycloolefin copolymer having a glass transition temperature greater than 120° C. is used in the outer layer, the assurance that the cycloolefin copolymer can be drawn together with the other polyester polymers of the film is frequently lost. In this case, the cycloolefin copolymer separates from the other copolymers in the course of biaxial stretching, and vacuoles are formed, which are unwanted.

Cycloolefin polymers are homopolymers or copolymers which contain polymerized cycloolefin units and, where appropriate, acyclic olefin comonomers. Suitable cycloolefin polymers for the present invention are those containing from 0.1 to 100% by weight, preferably from 10 to 99% by weight, more preferably from 50 to 95% by weight, based in each case on the total mass of the cycloolefin polymer, of polymerized cycloolefin units. Particular preference is given to polymers constructed from the cyclic olefins of the formula I, II, III, IV, V or VI:

(I)

(II)

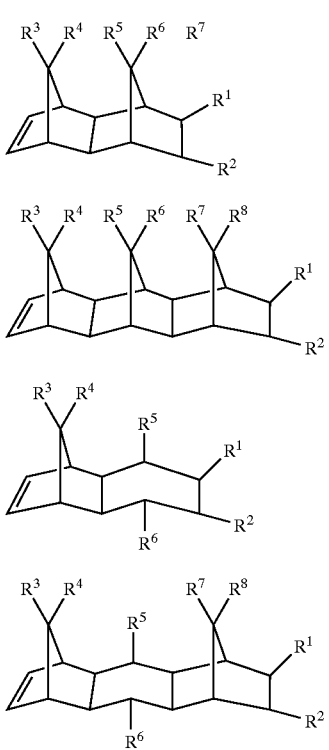

where $R^1$, $R^2$, $R^3$, $R^4$, $R^5$, $R^6$, $R^7$ and $R^8$ are identical or different and independently of one another denote a hydrogen atom or a $C_1$–$C_{30}$ hydrocarbon radical or else two or more of the radicals $R^1$ to $R^8$ are joined cyclically to one another, it being possible for the same radicals in the different formulae to have identical or different definitions. Examples of preferred $C_1$–$C_{30}$ hydrocarbon radicals are linear or branched $C_1$–$C_8$ alkyl radicals, $C_6$–$C_{18}$ aryl radicals, $C_7$–$C_{20}$ alkylenearyl radicals, cyclic $C_3$–$C_{20}$ alkyl radicals, and acyclic $C_2$–$C_{20}$ alkenyl radicals.

The cycloolefin polymers may contain from 0 to preferably 45% by weight, based on the total mass of the cycloolefin polymer, of polymerized units of at least one monocyclic olefin of the formula VII:

(VII)

where n is preferably a number from 2 to 10.

The cycloolefin polymers may further contain from 0 to 99% by weight, based on the total mass of the cycloolefin polymer, of polymerized units of an acyclic olefin of the formula VIII:

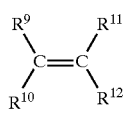

(VIII)

where $R^9$, $R^{10}$, $R^{11}$, and $R^{12}$ are identical or different and independently of one another denote a hydrogen atom or a $C_1$–$C_{10}$ hydrocarbon radical, e.g., a $C_1$–$C_8$ alkyl radical or $C_6$–$C_{14}$ aryl radical.

Likewise suitable in principle are cycloolefin polymers obtained by ring-opening polymerization of at least one of the monomers of the formulae I to VI and subsequent hydrogenation Cycloolefin homopolymers are synthesized from one monomer of the formulae I–VI. These cycloolefin polymers or copolymers of the formulae I–VI with VII are less suitable for the purposes of the present invention.

Cycloolefin copolymers (COCs) particularly suitable for the purposes of the present invention are those comprising at least one cycloolefin of the formulae I to VI and at least one acyclic olefin comonomer of formula VIII. Above and below, these cycloolefin copolymers which can be used with preference in accordance with the invention are called COCs. Preferred acyclic olefins VIII are those containing in total from 2 to 20 carbon atoms, especially unbranched acyclic olefins having from 2 to 10 carbon atoms such as ethylene, propylene and/or butylene, for example. The fraction of polymerized units of acyclic olefins of the formula VIII is up to 99% by weight, preferably from 5 to 80% by weight, more preferably from 10 to 60% by weight, based on the total weight of the respective cycloolefin copolymer.

Among the cycloolefin copolymers described above, particular preference is given to those comprising polymerized units of polycyclic olefins with a norbornene parent structure; particular preference is given to norbornene or tetracyclododecene. Also particularly preferred are cycloolefin copolymers (COCs) containing polymerized units of acyclic olefins, especially ethylene. Particularly preferred in turn are norbornene/ethylene and tetracyclododecene/ethylene copolymers containing from 5 to 80% by weight, preferably from 10 to 60% by weight, of ethylene units (based on the weight of the copolymer).

The above-described cycloolefin polymers generally have glass transition temperatures of between −20° C. and 400° C. For the present invention it is possible in particular to use cycloolefin copolymers (COCs) which have a glass transition temperature $T_g$ of below 120° C., preferably below 100° C., and more preferably below 80° C. The viscosity number (decalin, 135° C., DIN 53 728) is advantageously between 0.1 and 200 ml/g, preferably between 50 and 150 ml/g.

The cycloolefin copolymers (COCs) are prepared by heterogeneous or homogeneous catalysis with organometallic compounds, as described in a large number of documents. Suitable catalyst systems based on cocatalysts of titanium compounds and/or vanadium compounds in conjunction with aluminum organyls are described in DD 109 224, DD 237 070, and EP-A-0 156 464. EP-A-0 283 164, EP-A-0 407 870, EP-A-0 485 893, and EP-A-0 503 422 describe the preparation of cycloolefin copolymers (COCs) with catalysts based on soluble metallocene complexes. The cycloolefin polymer preparation processes described in abovementioned documents are expressly incorporated here by reference.

For the film of the present invention use was made particularly preferably of cycloolefin copolymers (COCs) prepared by means of catalysts based on soluble metallocene complexes.

The cycloolefin copolymers are incorporated into the film in the form either of straight granules or of a granulated concentrate (masterbatch). The polyester granules and any further components are for this purpose premixed with the cycloolefin copolymer (COC) or cycloolefin copolymer (COC) masterbatch and then the premix is supplied to the extruder. Within the extruder, the components undergo further mixing and are heated to processing temperature. For the preparation process of the invention it is advantageous for the extrusion temperature to be well above the glass transition temperature $T_g$ of the cycloolefin copolymer (COC); generally at least 30° C., preferably from 40 to 230° C., but in particular from 50 to 200° C. above the glass transition temperature of the cycloolefin copolymer (COC).

The outer layer A of the film of the present invention comprises preferably at least one further base material component (i.e., component II). This component has a composition based preferably on polyester base materials. These additive component(s) may be homopolymers, as described above for the base layer B, i.e., PET or PEN, for example. For the outer layer A it is also advantageously possible to use copolymers or mixtures or blends of homo- and/or copolymers as further components.

It is particularly advantageous to use, as component II in the outer layer A, a polyester copolymer or a polyester blend based on isophthalic acid and terephthalic acid. In this case the optical properties of the film, the adhesion between the individual layers, and the barrier properties achieved in the film in accordance with the present invention are especially good.

In this case the outer layer A of the film of the invention essentially comprises as component I the COC and as component II a polyester copolymer or a blend of polyester composed predominantly or wholly of isophthalic acid and terephthalic acid units and of ethylene glycol units. The remaining monomer units originate from other aliphatic, cycloaliphatic or aromatic diols and/or dicarboxylic acids, such as may also occur in the base layer. The preferred copolyesters, both for the base layers and for the outer layers, which provide the desired properties of the film (optical properties, adhesion, joint drawability), are those constructed of ethylene terephthalate and ethylene isophthalate units. The fraction of ethylene terephthalate is preferably from 40 to 98 mol % and the corresponding fraction of ethylene isophthalate from 60 to 2 mol %. Of these, preference is given to those copolyesters wherein the fraction of ethylene terephthalate is from 50 to 95 mol % and the corresponding fraction of ethylene isophthalate from 50 to 5 mol %, and very particular preference in turn is given to those copolyesters wherein the fraction of ethylene terephthalate is from 60 to 85 mol % and the corresponding fraction of ethylene isophthalate from 40 to 15 mol %. These preferred copolyesters contain no units other than ethylene terephthalate and ethylene isophthalate.

In order to provide a film having the barrier values (or permeation coefficients) for watervapor in accordance with the invention and the adhesion values between the outer layer A and the base layer B in accordance with the invention, it has been found to be appropriate to select the base material composition in outer layer and base layer as follows:

In accordance with the invention the base layer B contains a cycloolefin copolymer (COC) in a fraction of from 0 to 30% by weight and the outer layer A contains a cycloolefin copolymer (COC) in a fraction of from 20 to 100% by weight.

If, for example, the cycloolefin copolymer fraction in the outer layer A is high, e.g., above 80% by weight, then in order reliably to obtain a minimum adhesion of 0.5 N/25 mm between the two layers A and B the cycloolefin copolymer fraction in the base layer B should be above 15% by weight.

Where, alternatively, the outer layer A contains a cycloolefin copolymer in a fraction of less than 60% by weight, then in order to provide a minimum adhesion of 0.5 N/25 mm between the two layers A and B there is no need to use any cycloolefin copolymer in the base layer B.

These indications are guideline values which additionally facilitate the discovery of the appropriate film composition in any given case.

In one preferred embodiment of the invention, from 0.1 to 25% by weight of the polymers of the base layer B are identical with those of the base layer A. They are either admixed to the base layer B directly during extrusion or else present automatically in the film as a result of addition of reclaim.

The thickness of the outer layer A is generally more than 1.0 mm and is preferably situated in the range from 1.5 to 20 mm, more preferably from 2.0 to 10 mm.

In another preferred embodiment, the polyester film of the present invention may further comprise a second outer layer, C. The construction, thickness, and chemical composition of the second outer layer, C, may be chosen independently of the existing outer layer, A, it being possible for the second outer layer, C, likewise to include the aforementioned polymers or polymer mixtures, which need not, however, necessarily be identical with the polymers for the first outer layer, A. The second outer layer, C, may also comprise other common outer layer polymers. The layer structure of this film is then A-B-C.

The base layer B and/or the outer layers may further comprise customary additives, such as stabilizers and antiblocking agents, for example. These are advantageously added to the polymer or to the polymer mixture at an early stage, prior to the melting operation. Examples of stabilizers used include phosphorus compounds such as phosphoric acid or phosphoric esters. Typical antiblocking agents (also referred to in this context as pigments) are organic and/or inorganic particles, examples being calcium carbonate, amorphous silica, talc, magnesium carbonate, barium carbonate, calcium sulfate, barium sulfate, lithium phosphate, calcium phosphate, magnesium phosphate, alumina, LiF, calcium, barium, zinc or manganese salts of the dicarboxylic acids used, carbon black, titanium dioxide, kaolin, or crosslinked particles of polystyrene or of acrylate.

As additives it is also possible to select mixtures of two or more antiblocking agents or mixtures of antiblocking agents with the same composition but different particle sizes. The particles may be added to the individual layers in the customary concentrations, in the form, for example, of a glycolic dispersion during polycondensation or by way of masterbatches during extrusion. Pigment concentrations within the layers of from 0.0001 to 5% by weight have proven advantageous. A detailed description of the antiblocking agents is given, for example, in EP-A-0 602 964.

The thickness of the outer layer C is generally greater than 0.5 µm and is situated preferably in the range from 0.5 to 5 µm, in particular from 0.7 to 4 µm, the thickness of the outer layers A and C being identical or different.

The overall thickness of the polyester film of the invention may vary within broad limits and is guided by the intended use. It is usually from 6 to 300 µm, preferably from 8 to 200 µm, more preferably from 10 to 100 µm, the base layer B accounting for preferably from 40 to 95% of the overall thickness.

The present invention additionally provides a process for producing the films of the invention. To produce the outer layer A it is advantageous to supply the respective components (component I=COC granules, component II=polyester homopolymer or polyester copolymer or mixtures thereof, possibly further polymers) directly to the extruder. The materials can be extruded at about 300° C. From a technical standpoint (commixing of the comparatively very different polymers, tendency of the cycloolefin copolymers to stick to metal walls since the glass transition temperature is less than 120° C.) it has proven especially advantageous to carry out the extrusion at least of the polymers for the outer layer A on a twin-screw extruder with one or more devolatilizing means.

The polymers or polymer for the base layer B are or is supplied advantageously by way of a further extruder (here again, the twin-screw extruder is to be preferred over the single-screw extruder for fundamental reasons). The melts are shaped in a multilayer nozzle to give flat melt films and are layered one above another. The multilayer film is then taken off with the aid of a chill roll and, where appropriate, further rolls, and solidified.

Biaxial stretching is generally carried out sequentially. In this context it is preferred to carry out stretching first in the lengthwise direction, i.e., in the machine direction, and then in the transverse direction, i.e., perpendicular to the machine direction. Stretching in the lengthwise direction can be accomplished using two rolls which rotate at different speeds in accordance with the desired draw ratio. Transverse stretching is generally accomplished using a corresponding tenter frame.

The temperature at which stretching is carried out may vary within a relatively wide range and is guided by the desired properties of the film. Generally speaking, stretching in the lengthwise direction is carried out within a temperature range from 80 (heating temperature 80 to 130° C.) to 130° C. (stretching temperature 80–130° C., dependent on the stretching unit) and transverse stretching within a temperature range from 80 to 140° C. The lengthwise draw ratio is preferably in the range from 2.0:1 to 5.0:1, in particular from 2.3:1 to 4.8:1. The transverse draw ratio is generally in the range from 2.5:1 to 5.0:1, preferably from 2.8:1 to 4.5:1.

In the course of subsequent heat setting, the film is held at a temperature from 150 to 250° C. for a period of about 0.1 to 10 s. The film is subsequently wound up in conventional fashion.

A further advantage of the invention is that the production costs of the film of the invention are not substantially greater than those of a film made from standard polyester base materials. Additionally, for the production of the film it is ensured that scrap material obtained in cutting operations during film production can be reused as reclaim for film production, in an amount of up to 60% by weight, preferably from 10 to 50% by weight, based in each case on the total weight of the film, without any notable adverse effect on the physical properties of the film.

In addition to a multiplicity of further applications, the film of the invention is outstandingly suitable for the packaging of foods and other consumable items. The film of the invention is notable for outstanding barrier properties, particularly with respect to water vapor.

The following table (Table 1) summarizes once again the most important properties of the film of the invention.

TABLE 1

| | Inventive range | Preferred | More preferred | Units | Measurement method |
|---|---|---|---|---|---|
| Outer layer A | | | | | |
| Component I (=cyclo-olefinic copolymer COC) | 20 to 100 | 20 to 95 | 30 to 90 | % by weight | |
| Component II (=polyester homo- and/or copolymer) | 0 to 80 | 5 to 75 | 10 to 70 | % by weight | |
| Glass transition temperature of the COC used | <120 | <100 | <80 | ° C. | |
| Thickness of outer layer A | >1.0 | >2.0 | >3.0 | μm | |
| Base layer B | | | | | |
| Cycloolefinic copolymer COC | 0 to 30 | 2 to 25 | 5 to 20 | % by weight | |
| Glass transition temperature of the COC used | <120 | <100 | <80 | ° C. | |
| Film properties | | | | | |
| Permeation coefficient for water vapor | <35 | <30 | <25 | g[12 μm]/(m².d) | DIN 53122, Part 2, conditions B |
| Water vapor transmission rate (through a 12 μm film) | <35 | <30 | <25 | g/(m².d) | DIN 53122, Part 2, conditions B |
| Adhesion between layers A/B | >0.5 | >1.0 | >1.5 | N/25 mm | Internal |
| Haze of the film | <20 | <15 | <10 | % | ASTM-D 1003-52 |

Measurement Methods

The base materials and the films were characterized using the following methods:

DIN=Deutsches Institut fur Normung [German Institute of Standardization]

ASTM=American Society for Testing and Materials (1) Water Vapor Transmission Rate (WVTR)

The water vapor transmission rate was measured with a WDDG water vapor transmission rate meter from Brugger/Munich, in accordance with DIN 53122, part 2, conditions B (37.8° C., 90% relative humidity on one side of the film).

(2) Haze

The haze of the film was determined by a method based on ASTM-D 1003-52.

(3) SV (Standard Viscosity)

The standard viscosity SV (DCA) is measured, in a method based on DIN 53726, in dichloroacetic acid. The intrinsic viscosity (IV) is calculated as follows from the standard viscosity:

$$IV = [\eta] = 6{,}907 \cdot 10^{-4} \, SV \, (DCA) + 0{,}063096 \, [dl/g]$$

(4) Glass Transition Temperatures $T_g$

The glass transition temperatures $T_g 1$ and $T_g 2$ were determined on film samples by means of DSC (differential scanning calorimetry), using a DSC 1090 instrument from DuPont. The heating rate was 20 K/min and the sample mass about 12 mg. In the first heating procedure, the glass transition $T_g 1$ was determined. The samples in many cases exhibited enthalpy relaxation (a peak) at the beginning of the stepwise glass transition. The temperature taken as $T_g 1$ was that at which the stepwise change in the heat capacity— independent of the enthalpy relaxation peak —reached half its height in the first heating procedure. In all cases, only a single glass transition step was observed in the thermogram in the course of the first heating. It is possible that the enthalpy relaxation peaks masked the detail of the step or that the resolution of the instrument was insufficient to resolve the small, poorly defined transitions of oriented crystalline samples. In order to eliminate the thermal history, the samples were held at 300° C. for 5 minutes after heating up and were then quenched with liquid nitrogen. From the thermogram for the second heating, the temperature for the glass transition $T_g2$ was taken as the temperature at half the step height. This is the $T_g$ figure according to the invention.

(5) Adhesion Between the Layers

The film specimen (300 mm long·180 mm across) in accordance with the present invention is placed prior to adhesive bonding onto a smooth card (200 mm long 180 mm across; approximately 400 g/m², bleached, outer plies coated); the protruding film ends are to be turned over onto the reverse and fixed using adhesive tape.

Adhesive bonding of the film according to the present invention to a standard polyester film 12 μm thick (e.g., Melinex 800) is accomplished using a doctor blade apparatus and doctor blade rod no. 3 from Erichsen, Germany, with about 1.5 ml of adhesive (Novacote NC 275+CA 12; proportion: 4/1+7 parts of ethyl acetate) being applied to the outer layer A of the film according to the present invention. After air has been removed from the solvent, the standard polyester film is laminated to the outer layer A of the film according to the present invention using a metal roller (width 200 mm, diameter 90 mm, mass 10 kg, in accordance with DIN EN 20 535). The laminating parameters are as follows:

| | |
|---|---|
| Adhesive quantity: | 5 +/− 1 g/m² |
| Venting following application of the adhesive: | 4 min +/− 15 s |
| Doctor blade thickness (Erichsen): | 3 |
| Speed setting of the doctor blade: | about 133 mm/s |
| Cure time of the assembly: | 2 h at 70° C. in a forced-air oven |

Samples approximately 100 m long are taken using a 25+/−1 mm slitter. About 50 mm of assembly in 50 mm of unbonded single plies are required for fixing/clamping in the test specimen. The test specimens are to be fixed over the full area to a metal support plate, with the reverse of the film according to the present invention (base layer B or outer layer C), using double-sided adhesive tape. The plate with the assembly adhered to it is to be clamped into the lower jaw of the tensile testing machine. The jaw spacing is 100 mm. The unlaminated end of the standard polyester film is to be clamped into the upper jaw of the tensile testing machine (e.g., Instron, Zwick, Germany) so as to give a peel angle of 180°. The result reported is the average peel force in N/25 mm rounded to one place after the point.

| | |
|---|---|
| Sample width: | 25 mm |
| Initial force: | 0.1 N |
| Measurement length: | 25 mm |
| Peel speed up to initial force: | 25 mm/min |
| Initial travel: | 5 mm |
| Test travel: | 40 mm |
| Sensitivity: | 0.01 N |
| Peel speed: | 100 mm/min |

The result of the peel force measurement can be equated with the minimum bond strength between the layers of the film of the invention, since the bond strength between the adhesive and the standard film is much greater.

EXAMPLES

The following examples illustrate the invention. The products used (brand names and manufacturing company) are indicated in each case only once and after that refer to the following examples as well.

Example 1

Chips of COC and polyethylene terephthalate were supplied in a mixing ratio of 50:50 directly to the extruder (twin-screw extruder ZSK from Werner & Pfleiderer) for the outer layer A. In the extruder the two materials were extruded at a temperature of about 300° C. The melt was filtered, shaped to a flat film in a multilayer dye, and laid as outer layer A over the base layer B. The multilayer film was discharged via the dye lip and solidified on a chill roll. The residence time of the polymers in the extrusion was about 5 minutes.

Chips of polyethylene terephthalate were dried to a residual moisture content of less than 100 ppm at a temperature of 160° C. and supplied to the extruder for the base layer B.

Additionally, chips of polyethylene terephthalate and antiblocking agent were dried to a residual moisture content of 100 ppm likewise at 160° C. and supplied to the extruder (twin-screw extruder ZSK from Werner & Pfleiderer) for the outer layer C. The temperatures in the extruder for the outer layer C were the same as those of the coextruder A.

The three-layer film ABC had an overall thickness of 23 μm. The outer layer A had a thickness of 3.0 μm and the outer layer C a thickness of 1.0 μm.

| | |
|---|---|
| Outer layer A: | |
| 50% by weight | of COC (® Topas 8007 from Ticona, Germany, having a $T_g$ of about 75° C.) |
| 50% by weight | of polyethylene terephthalate having an SV of 800 |
| Base layer B: | |
| 100% by weight | of polyethylene terephthalate (4020 from KOSA, Offenbach) having an SV of 800, and |
| Outer layer C: | |
| 80% by weight | of polyethylene terephthalate having an SV of 800 and |
| 20% by weight | of masterbatch formed from 99.0% by weight of polyethylene terephthalate and 1.0% by weight of silica particles of which 50% had an average size of 2.5 μm and 50% an average size of 0.4 μm. |

The individual process steps were as follows:

| | | | |
|---|---|---|---|
| Extrusion | Temperatures | Outer layer A | 300° C. |
| | | Base layer B | 300° C. |
| | | Outer layer C | 300° C. |
| Longitudinal stretching | Temperature range: First heating roll 85° C. Stretching roll 130° C. | | 85–130° C. |
| | Longitudinal stretching ratio | | 3.8:1 |
| Transverse stretching | Temperature range Heating fields 85 to 95° C. Stretching fields 110 to 135° C. | | 85–135° C. |
| | Transverse stretching ratio | | 3.8:1 |
| Heat-setting | Temperature | | 230° C. |

The film had the required water vapor transmission rate and the required adhesion between layers A and B.

Example 2

As in Example 1, a three-layer film ABC with an overall thickness of 23 μm was produced by coextrusion. The outer layer A now had a thickness of 4 μm. The composition of the other layers was unchanged.

Outer layer A:

| | |
|---|---|
| 50% by weight | of COC (® Topas 8007 from Ticona, Germany, having a T$_g$ of about 75° C.) |
| 50% by weight | of polyethylene terephthalate having an SV of 800. |

Example 3

As in Example 1, a three-layer film ABC with an overall thickness of 23 μm was produced by coextrusion. The outer layer A had a thickness of 4 μm. In contrast to the previous examples, component 11 in the outer layer A was now 50% by weight of an amorphous copolyester of 78 mol % ethylene terephthalate in 22 mol % ethylene isophthalate (prepared by the transesterification method with Mn as transesterification catalyst, Mn concentration: 100 ppm). The composition of the other layers was unchanged.

Outer layer A:

| | |
|---|---|
| 50% by weight | of COC (® Topas 8007 from Ticona having a T$_g$ of about 75° C.) |
| 50% by weight | of polyester comprising an amorphous copolyester of 78 mol % of ethylene terephthalate and 22 mol % ethylene isophthalate (prepared by the transesterification method using Mn as transesterification catalyst, Mn concentration: 100 ppm). |

Example 4

As in Example 1, a three-layer film ABC with an overall thickness of 23 μm was produced by coextrusion. The outer layer A now contained 70% of COC with the aforementioned glass transition temperature of 75° C. Its thickness was still 3 μm. The composition of the other layers was unchanged.

Outer layer A:

| | |
|---|---|
| 70% by weight | of COC (® Topas 8007 from Ticona with a T$_g$ of about 75° C.) |
| 30% by weight | of polyethylene terephthalate having an SV of 800. |

Example 5

As in Example 1, a three-layer film ABC with an overall thickness of 23 μm was produced by coextrusion. Outer layer A now contained 85% by weight of COC (®Topas 8007) and the base layer contained 15% by weight of COC (®Topas 8007). The thickness of the outer layer was still 3 μm. There was no change in the composition of the layer C.

Outer layer A:

| | |
|---|---|
| 85% by weight | of COC (® Topas 8007 from Ticona with a T$_g$ of about 75° C.) |
| 15% by weight | of polyethylene terephthalate having an SV of 800. |

Base layer B:

| | |
|---|---|
| 85% by weight | of polyethylene terephthalate (4020 from KOSA, Offenbach) having an SV of 800 and |
| 15% by weight | of COC (® Topas 8007 from Ticona with a T$_g$ of about 75° C.) |

Example 6

As in Example 5, a three-layer film ABC was produced by coextrusion. The overall thickness of the film was now 12 μm. Outer layer A contained 85% by weight of COC ®Topas 8007) and the base contained 15% by weight of COC ®Topas 8007). The thickness of the outer layer was 4 μm. There was no change in the composition of the layer C.

The process conditions in Examples 2 to 6 were as in Example 1.

Comparative Example CE1

A film was produced as in Example 1. In this case the outer layer A contained no COC, instead having the composition of outer layer C.

Outer layer C:

| | |
|---|---|
| 80% by weight | of polyethylene terephthalate having an SV of 800 and |
| 20% by weight | of a masterbatch formed from 99.0% by weight of polyethylene terephthalate and 1.0% by weight of silica particles of which 50% had an average size of 2.5 μm and 50% had an average size of 0.4 μm. |

Comparative Example CE2

A film was produced as in Example 1. The COC of the outer layer A in this case had a glass transition temperature of 150° C.

Outer layer A:

| | |
|---|---|
| 50% by weight | of COC (® Topas 6015 from Ticona with a T$_g$ of about 150° C.) |
| 50% by weight | of polyethylene terephthalate having an SV of 800. |

The properties of the films produced in accordance with the inventive and comparative examples are compiled in Table 2.

TABLE 2

| Example | Film thickness (μm) | Film structure | Layer thicknesses A/B/C (μm) | COC fraction in outer layer A (%) | COC fraction in base layer B (%) | Glass transition temperature of COC $T_g$ | Permeation coefficient for water vapor (g.12 μm/m².d) | Water vapor transmission rate (g/m².d) | Adhesion between layers A and B (N/25 mm) | Haze of the film (%) |
|---|---|---|---|---|---|---|---|---|---|---|
| E1 | 23 | ABC | 3/19/1 | 50 | 0 | 75 | 29 | 15 | 2.5 | 10 |
| E2 | 23 | ABC | 4/18/1 | 50 | 0 | 75 | 23 | 12 | 2.4 | 11 |
| E3 | 23 | ABC | 4/18/1 | 50 | 0 | 75 | 22 | 11 | 2.8 | 8 |
| E4 | 23 | ABC | 3/19/1 | 70 | 0 | 75 | 23 | 12 | 1.6 | 10 |
| E5 | 23 | ABC | 3/19/1 | 85 | 15 | 75 | 13 | 7 | 1.8 | 8 |
| E6 | 12 | ABC | 4/7/1 | 85 | 15 | 75 | 14 | 14 | 1.8 | 6 |
| CE1 | 23 | ABC | 3/19/1 | 0 | 0 |  | 42 | 22 | >5 | 2.0 |
| CE2 | 23 | ABC | 3/19/1 | 50 | 0 | 150 | 44 | 23 | 2.3 | 45 |

What is claimed is:

1. A multilayer, transparent, biaxially oriented polyester film which has a base layer B composed of at least 50% by weight of a thermoplastic polyester directly adhered to at least one outer layer A, wherein
   a) the base layer B comprises a fraction of from about 0 to about 30% by weight of a cycloolefin copolymer (COC),
   b) the outer layer A comprises a fraction of from about 20 to about 100% by weight of a cycloolefin copolymer (COC),
   c) the glass transition temperature $T_g$ of the cycloolefin copolymer (COC) is below about 120° C., and
   d) the permeation coefficient of the film for water vapor is smaller than 35 g/m²d.

2. The polyester film as claimed in claim 1, wherein the base layer B comprises a fraction of from about 2 to about 25% by weight of the COC.

3. The polyester film as claimed in claim 1, wherein the outer layer A comprises a fraction of from about 25 to about 95% by weight of the COC.

4. The polyester film as claimed in claim 1, wherein the glass transition temperature of the COC is below about 100° C.

5. The polyester film as claimed in claim 1, wherein the COC comprises at least one cycloolefin and at least one acyclic olefin as comonomer.

6. The polyester film as claimed in claim 1, wherein the COC contains, as cycloolefin comonomer, norbornene or tetracyclododecene, or norbornene and tetracyclododecene and, as acyclic comonomer, ethylene, propylene, or butylene.

7. The polyester film as claimed in claim 1, wherein polyester homo- or copolymers or homo- and copolymers are used as thermoplastic polyester of the base layer B.

8. The polyester film as claimed in claim 1, wherein the thermoplastic polyester of the base layer B is polyethylene terephthalate or polyethylene 2,6-naphthalate.

9. The polyester film as claimed in claim 1, wherein the outer layer A comprises, besides the COC, a polyester homo- or copolymer.

10. The polyester film as claimed in claim 9, wherein the polyester homopolymer for the outer layer A is polyethylene terephthalate or polyethylene 2,6-naphthalate.

11. The polyester film as claimed in claim 9, wherein the polyester copolymer for the outer layer A is a copolymer composed of ethylene terephthalate units and of ethylene isophthalate units.

12. The polyester film as claimed in claim 1, wherein adhesion between the outer layer A and the base layer B is greater than about 0.5 N/25 mm.

13. The polyester film as claimed in claim 1, which has an ABC layer structure, the outer layers A and C being identical or different.

14. The polyester film as claimed in claim 1, which has a haze of less than about 20%.

15. The polyester film as claimed in claim 1, wherein the base layer or the outer layers or the base layer and the outer layers comprise additional additives.

16. A process for producing a polyester film as claimed in claim 1, encompassing the steps of
   a) producing the film by coextrusion, at least comprising a base layer B and an outer layer A and shaping the melts to give flat melt films,
   b) stretching the film biaxially, and
   c) heat-setting the stretched film,
wherein
   d) the base layer B comprises a fraction of from about 0 to about 30% by weight of a cycloolefin copolymer (COC),
   e) the outer layer A comprises a fraction of from about 20 to about 100% by weight of a cycloolefin copolymer (COC), and
   f) the glass transition temperature $T_g$ of the cycloolefin copolymer (COC) is below about 120° C.

17. Method of making a barrier film for water vapor, which comprises converting a film as claimed in claim 1 into a barrier film for water vapor.

18. Method of making a packaging film which comprises converting a film as claimed in claim 1 into a packaging film.

19. A multilayer, transparent biaxially oriented polyester film comprising a base layer B composed of at least 50% by weight of a thermoplastic polyester and at least one outer layer A,
   the outer layer A comprising rater than 80% by weight of a cycloolefin copolymer (COC),
   the base layer B comprising from about 15 to about 30% by weight of said cycloolefin copolymer (COC),
   wherein the glass transition temperature, $T_g$ of the cycloolefin copolymer (COC) is below about 120° C., and
   the adhesion between said outer layer A and said base layer B is at least 0.5 N/25 mm.

20. A multilayer film according to claim 19, wherein from 0.1 to 25% by weight of the polymers of the base layer B are identical with those of the base layer A.

21. A multilayer, transparent, biaxially oriented polyester film comprising a base layer B composed of at least 50% by weight of a thermoplastic polyester and at least one outer layer A, said outer layer A comprising less than 60% by weight of a cycloolefin copolymer (COC), said cycloolefin copolymer (COC) absent from said base layer B, wherein the glass transition temperature, $T_g$ of the cycloolefin copolymer (COC) is below about 120° C., and the adhesion between said outer layer A and said base layer B is at least 0.5 N/25 mm.

22. A multilayer film according to claim 21, wherein from 0.1 to 25% by weight of the polymers of the base layer B are identical with those of the base layer A.

* * * * *